US011333022B2

(12) United States Patent
Dyson et al.

(10) Patent No.: US 11,333,022 B2
(45) Date of Patent: May 17, 2022

(54) AIRFOIL WITH THERMALLY CONDUCTIVE PINS

(71) Applicant: General Electric Company, Schenectady, NY (US)

(72) Inventors: Thomas Earl Dyson, Niskayuna, NY (US); Kimberly Hammer, Niskayuna, NY (US); Jared Iverson, Niskayuna, NY (US); Gerald Rawcliffe, Greenville, SC (US); Patrick Willson, Clifton Park, NY (US); Akane Suzuki, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 364 days.

(21) Appl. No.: 16/533,393

(22) Filed: Aug. 6, 2019

(65) Prior Publication Data
US 2021/0040856 A1 Feb. 11, 2021

(51) Int. Cl.
*F01D 5/18* (2006.01)
*F01D 5/14* (2006.01)
(Continued)

(52) U.S. Cl.
CPC ............... *F01D 5/147* (2013.01); *F01D 5/18* (2013.01); *B22C 9/10* (2013.01); *B22C 21/14* (2013.01); *F05D 2230/21* (2013.01)

(58) Field of Classification Search
CPC . F01D 5/147; F01D 5/28; F01D 5/282; B22C 9/10; B22C 21/14
See application file for complete search history.

(56) References Cited

U.S. PATENT DOCUMENTS 2,648,520 A 8/1953 Schmitt
3,647,316 A * 3/1972 Moskowitz ............. F01D 5/183
416/97 R
(Continued)

FOREIGN PATENT DOCUMENTS

DE 19926817 A1 12/2000
EP 1489264 A1 12/2004
(Continued)

OTHER PUBLICATIONS

E.Couch et al., "Comparison of Measurements and Predictions for Blowing from a Turbine Blade Tip", Journal of Propulsion and Power, vol. 21, Issue: 02, pp. 335-343, Mar. 2005.
(Continued)

*Primary Examiner* — Sabbir Hasan
(74) *Attorney, Agent, or Firm* — The Small Patent Law Group LLC; Philip S. Hof

(57) ABSTRACT

An airfoil includes a multi-part body and one or more thermally conductive pins. The multi-part body has an interior region and is formed from multiple pieces joined with each other at an interface. The pieces have multiple cavities and at least one of the pieces defines airfoil cooling channels disposed within the interior region of the body. The one or more thermally conductive pins are within the interior region of the body and extend across the interface. Each of the thermally conductive pins has a first segment disposed within a corresponding cavity of a first piece of the multiple pieces and a second segment disposed within a corresponding cavity of a second piece of the multiple pieces.

20 Claims, 5 Drawing Sheets

(51) Int. Cl.
  *B22C 9/10* (2006.01)
  *B22C 21/14* (2006.01)

(56) References Cited

U.S. PATENT DOCUMENTS

| | | | | |
|---|---|---|---|---|
| 4,118,146 A * | 10/1978 | Dierberger | ............... | F01D 5/189 |
| | | | | 416/97 A |
| 4,396,349 A | 8/1983 | Hueber | | |
| 4,563,128 A | 1/1986 | Rossmann | | |
| 5,088,888 A | 2/1992 | Bobo | | |
| 5,328,331 A * | 7/1994 | Bunker | ................... | F01D 5/187 |
| | | | | 415/115 |
| 5,484,258 A * | 1/1996 | Isburgh | ................... | F01D 5/187 |
| | | | | 415/115 |
| 6,234,755 B1 * | 5/2001 | Bunker | ..................... | F01D 5/20 |
| | | | | 416/97 R |
| 6,261,054 B1 * | 7/2001 | Bunker | ................... | F01D 5/187 |
| | | | | 415/115 |
| 6,305,904 B1 * | 10/2001 | Weigand | ................. | F01D 5/187 |
| | | | | 416/97 R |
| 6,413,041 B1 | 7/2002 | Sedillo | | |
| 7,600,977 B2 | 10/2009 | Shadbolt et al. | | |
| 7,828,515 B1 * | 11/2010 | Kimmel | ................... | F01D 5/189 |
| | | | | 415/115 |
| 8,267,659 B2 * | 9/2012 | Ahmad | ................... | F01D 5/182 |
| | | | | 416/97 R |
| 8,303,252 B2 * | 11/2012 | Piggush | ................. | F01D 5/187 |
| | | | | 416/97 R |
| 10,030,532 B2 | 7/2018 | Eastman et al. | | |
| 2001/0018021 A1 * | 8/2001 | Anding | ................... | F01D 5/188 |
| | | | | 415/115 |
| 2007/0128031 A1 * | 6/2007 | Liang | ...................... | F01D 5/187 |
| | | | | 416/97 R |
| 2007/0258825 A1 | 11/2007 | Shadbolt et al. | | |
| 2009/0252612 A1 * | 10/2009 | Ahmad | ................... | F01D 5/147 |
| | | | | 416/241 A |
| 2019/0017389 A1 | 1/2019 | Rathay et al. | | |
| 2019/0017391 A1 | 1/2019 | Dyson et al. | | |
| 2020/0063581 A1 * | 2/2020 | Vetters | .................... | F01D 9/041 |
| 2020/0182071 A1 * | 6/2020 | Spangler | ................. | F01D 5/189 |

FOREIGN PATENT DOCUMENTS

| | | | | |
|---|---|---|---|---|
| JP | 10196304 A | * | 7/1998 | ............... F28F 1/124 |
| JP | 2011185129 A | | 9/2011 | |
| JP | 5451463 B2 | | 3/2014 | |

OTHER PUBLICATIONS

International Search Report and Written Opinion dated Oct. 22, 2020 for corresponding Application No. PCT/US2020/045191.

* cited by examiner

AIRFOIL WITH THERMALLY CONDUCTIVE PINS

FIELD

The subject matter described herein relates to an airfoils, such as turbine or fan blades.

BACKGROUND

Airfoils or blades used in rotary applications may be composed of metal that is cast in a mold. Modern airfoils may include a network of cooling channels within the interior of the airfoil for distributing a cooling fluid, such as air, to absorb and dissipate heat from outer surfaces of the airfoil that may be exposed to high temperatures. The cooling channels are typically formed during the casting process via the use of a core structure within a shell. The core structure includes thin rods that represent the inverse or negative of the cooling channels. The core structure may also include support posts that connect to some of the thin rods to structurally support the thin rods and ensure that the thin rods are held in a fixed position relative to the shell during the casting process. The core structure, including the rods and support posts, are removed after the casting to define the open cooling channels in place of the rods and voids or cavities in place of the support posts.

These openings and voids may interfere with the functioning of the airfoil. For example, the openings and voids filled with air or another gas may provide thermally insulative zones which inhibit heat transfer from the hot outer surfaces of the airfoil to the cooling channels. Furthermore, the openings and voids may provide bridge paths between the cooling channels and a perimeter surface of the airfoil, which may undesirably enable the cooling fluid to exit the cooling channels and/or may enable debris or contaminants to enter the cooling channels. The debris or contaminants may plug or otherwise obstruct the cooling channels, reducing the effectiveness of the cooling channels.

SUMMARY

In one or more embodiments, an airfoil is provided that includes a multi-part body and one or more thermally conductive pins. The multi-part body has an interior region and is formed from multiple pieces joined with each other at an interface. The pieces have multiple cavities and at least one of the pieces defines airfoil cooling channels disposed within the interior region of the body. The one or more thermally conductive pins are within the interior region of the body and extend across the interface. Each of the thermally conductive pins has a first segment disposed within a corresponding cavity of a first piece of the multiple pieces and a second segment disposed within a corresponding cavity of a second piece of the multiple pieces.

In one or more embodiments, a method for producing an airfoil is provided that includes obtaining first and second pieces of a multi-part body. Each of the first and second pieces includes a respective mating surface and defines multiple respective cavities that extend parallel to one another and are open at the mating surface. The method includes inserting one or more thermally conductive pins into the cavities of the first piece such that each thermally conductive pin is received into a different corresponding cavity. Each of the one or more thermally conductive pins has a first segment disposed within a corresponding one of the cavities of the first piece and a second segment that projects beyond the mating surface of the first piece. The method also includes coupling the second piece of the multi-part body to the first piece such that the second segment of each thermally conductive pin is received into a corresponding cavity of the second piece for aligning the second piece to the first piece.

In one or more embodiments, an airfoil is provided that includes a body and one or more thermally conductive pins. The body has exterior surfaces and an interior region. The body defines multiple cavities and a network of cooling channels within the interior region. The cavities are parallel to one another. The network of cooling channels is fluidly connected to respective interior ends of the cavities. The one or more thermally conductive pins are disposed within the cavities such that each thermally conductive pin is disposed within a different corresponding cavity. The one or more thermally conductive pins fill at least a majority of the corresponding cavities without extending into the network of cooling channels. A material composition of the one or more thermally conductive pins has a greater thermal conductivity than a material composition of the body.

BRIEF DESCRIPTION OF THE DRAWINGS

The present inventive subject matter will be better understood from reading the following description of non-limiting embodiments, with reference to the attached drawings, wherein below.

DETAILED DESCRIPTION

The embodiments described herein provide an airfoil that includes a body and multiple thermally conductive pins disposed within cavities in the body. The thermally conductive pins may provide several different functions for the airfoil related to thermal control and/or structural support and alignment. For example, the conductive pins may plug the cavities to reduce or eliminate the presence of air pockets within the airfoil that may store heat. In addition, the conductive pins within the cavities may provide thermally conductive paths within the airfoil to enhance heat transfer into the cooling channels. Optionally, the conductive pins may have a composition that is more thermally conductive than the composition of the body of the airfoil, so the conductive pins may provide less thermal resistance to heat transfer than the interior structure of the body. The conductive pins may provide structural support and alignment for the airfoil in embodiments in which the airfoil has a two-piece body. For example, the two pieces may couple together at an interface to define the body. The conductive pins may be used to align and guide the pieces together during the coupling stage. The conductive pins may increase the efficiency and/or accuracy of coupling the two pieces together by providing guide posts that extend across the interface.

The airfoils described herein represent rotating members of a rotary assembly, such as blades of a propeller, turbine, compressor, fan, windmill, engine, or the like. In at least one embodiment, the airfoils described herein may be turbine blades for a gas turbine engine. The gas turbine engine may be disposed in a vehicle, such as an aircraft, an automobile, a boat, or the like, or may be mounted in a stationary application, such as within an industrial facility. Embodiments of the disclosure described herein are not limited to turbine blades of a gas turbine engine, however.

Figure 1:
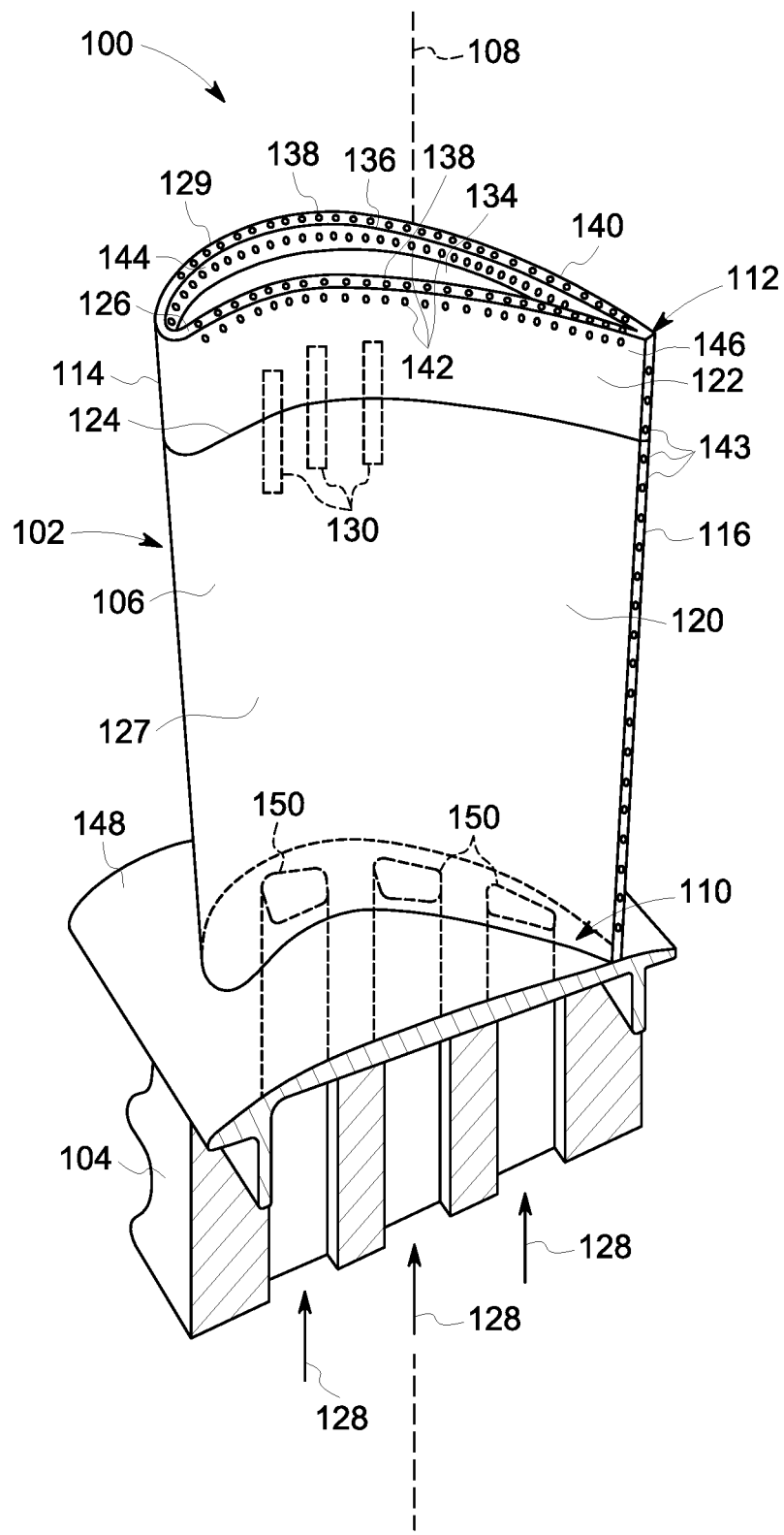
FIG. 1 is a perspective view of a rotor blade according to an embodiment that includes an airfoil and a dovetail.

FIG. 1 is a perspective view of a rotor blade 100 according to an embodiment that includes an airfoil 102 and a dovetail or base 104. The airfoil 102 includes a body 106 that extends along a length axis 108 from a mounting end 110 (or root) of the body 106 to a distal end 112 of the body 106. The distal end 112 is opposite the mounting end 110. When the rotor blade 100 is assembled into a rotor assembly, the length axis 108 of the airfoil 102 may extend radially from a hub or center of the rotor assembly. The mounting end 110 of the body 106 is affixed to the dovetail 104. The airfoil 102 is cantilevered from the dovetail 104 such that only the mounting end 110 is directly secured to the dovetail 104. The body 106 of the airfoil 102 includes a leading edge 114 and a trailing edge 116. Both the leading edge 114 and the trailing edge 116 extend from the mounting end 110 to the distal end 112. The body 106 may have a contoured shape to produce an aerodynamic force when moving through a fluid, such as air, steam, combustion gases, or the like. The aerodynamic force may cause the rotor assembly to rotate. The body 106 includes an outer wall 126 that has a concave-shaped exterior surface (e.g., a pressure side) 127 and a convex-shaped exterior surface (e.g., a suction side) 129 joined together to define the shape of airfoil 102. In a non-limiting example application, the rotor blade 100 may be a component of a turbine of a gas turbine engine, but the airfoils according to the embodiments described herein may be utilized in other applications as described above.

In the illustrated embodiment, the body 106 is a two-part component that is defined by a first piece 120 and a second piece 122. The first piece 120 is connected to the second piece 122 at an interface 124 defined between the first and second pieces 120, 122. The interface 124 is shown in FIG. 1 to include a seam, but the seam optionally may be covered or filled by another material, such as a thermal coating, braze filler material, or the like. As a result, a seam at the interface 124 may not be visible on the finished airfoil 100 once manufacturing is complete. The first piece 120 and the second piece 122 of the body 106 define different sections or portions of the body 106 along the length axis 108. For example, the first piece 120 may be a base piece that defines a length of the body 106 from the mounting end 110 to the interface 124. The second piece 122 may be a cap piece that defines a length of the body 106 from the interface 124 to the distal end 112. As used herein, the first piece 120 is also referred to as base piece 120, and the second piece 122 is also referred to as cap piece 122.

The airfoil 102 also includes plural thermally conductive pins 130 disposed within the body 106. The thermally conductive pins 130, also referred to herein as pins 130 and conductive pins 130, are shown in phantom in FIG. 1 because the pins 130 are disposed behind the outer wall 126 of the body 106 which blocks the view of the pins 130. The pins 130 may be entirely disposed (e.g., contained) within an interior of the body 106. The pins 130 in the illustrated embodiment extend across the interface 124. For example, each of the pins 130 is partially disposed within the base piece 120 and partially disposed within the cap piece 122. The pins 130 may be utilized as guide posts when coupling the cap piece 122 to the base piece 120 to ensure proper alignment of the two pieces 120, 122. For example, the pins 130 are oriented parallel to one another and parallel to the length axis 108. As the cap piece 122 is being mounted to the base piece 120, the pins 130 may guide the cap piece 122 in a loading direction relative to the base piece 120 that is parallel to the length axis 108. Optionally, the pins 130 may be oriented parallel to one another but transverse to the length axis 108, such that the pins 130 guide the coupling of the two pieces 120, 122 in a loading direction that is transverse to the length axis 108. The pins 130 may also readily conduct heat through the body 106 to distribute heat from high temperature areas to a cooling fluid, as described herein. The airfoil 102 includes three pins 130 in the illustrated embodiment, but the airfoil 102 may have any number of pins 130 in other embodiments, such as two, four, five, eight, or the like.

The cap piece 122 may include a recessed wall 134 and a tip rail 136 projecting outward (e.g., along the length axis 108) beyond from recessed wall 134. The tip rail 136 may be referred to as a squealer tip rail. The tip rail 136 defines a plurality of apertures 138 along a distal edge 140 of the tip rail 136. The tip rail 136 may also define apertures 142 along an inner surface 144 of the tip rail 136 and/or along an outer surface 146 of the tip rail 136. The inner surface 144 faces inward towards the inner surface 144 of the portion of the tip rail 136 across the recessed wall 134. The outer surface 146 faces outward in an opposite direction as the inner surface 144. The apertures 138, 142 provide openings for receiving and emitting air or other fluids into the body 106 of the airfoil 102. For example, at least some of the apertures 138, 142 may be fluidly connected to an internal network of cooling passages within the body 106 that distributes a cooling fluid to absorb and dissipate heat. Optionally, the body 106 may also define apertures 143 at the trailing edge 116. The apertures 143 may be defined in both the cap piece 122 and the base piece 120, as shown, or only along one of the two pieces 120, 122 in an alternative embodiment.

Optionally, the rotor blade 100 may also include a platform 148 disposed at the interface between the airfoil 102 and the dovetail 104. In the gas turbine engine application, the platform 148 may be used to radially contain a turbine engine mainstream airflow driven by the blade 100. The dovetail 104 may be configured to mount to a turbine rotor disk on the engine. The dovetail 104 may define one or more inlet passages 128 that extend through the dovetail 104 and the platform 148 to provide internal fluid communication with the airfoil 102 via corresponding cooling passages 150 of the airfoil 102. For example, airflow may be able to enter the cooling passages 150 of the airfoil 102 through the inlet passages 128. The dovetail 104 is shown in cross-section in FIG. 1, and the section line extends through the inlet passages 128. The inlet passages 128 may be enclosed within the body of the dovetail 104 (except for the ends of the passages 128 to permit airflow therethrough).

Figure 2:
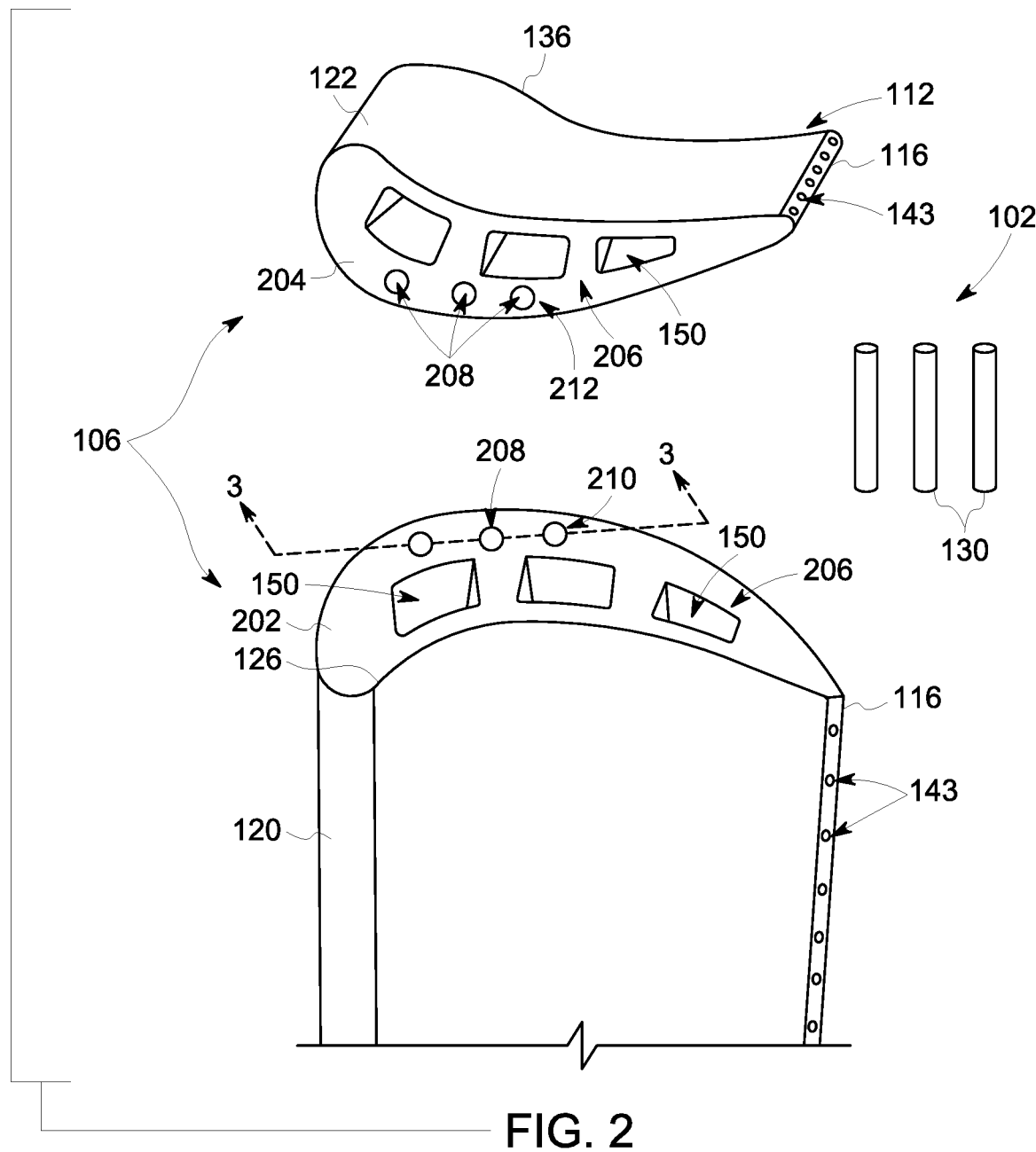
FIG. 2 is an exploded perspective view of the airfoil shown in FIG. 1.

FIG. 2 is an exploded perspective view of the airfoil 102. The body 106 has an interior region 206 surrounded by the outer wall 126 (or walls). The base piece 120 has a respective mating surface 202 within the interior region 206. The base piece 120 extends from the mounting end 110 (shown in FIG. 1) to the mating surface 202. The cap piece 122 has a respective mating surface 204 within the interior region 206. The cap piece 122 extends from the mating surface 204 to the distal end 112 of the airfoil 102. The mating surfaces 202, 204 define the interface 124 when the cap piece 122 is coupled to the base piece 120. For example, the mating surfaces 202, 204 face each other and optionally may abut against each other when the cap piece 122 is coupled to the base piece 120 to define the body 106. The material composition of the body 106 of the airfoil 102 may include one or more metals, such as nickel and/or titanium, including alloys thereof.

The interior region 206 of the body 106 includes the cooling passages 150 of the airfoil 102. The cooling passages 150 may extend through both the base piece 120 and the cap piece 122. The cooling passages 150 are open at the mating surfaces 202, 204. When the body 106 is assembled, the portions of the cooling passages 150 within the cap piece 122 align with and fluidly connect to corresponding portions of the cooling passages 150 within the base piece 120. The cooling passages 150 may be fluidly connected to the apertures 143 at the trailing edge 116 through cooling channels. The cooling passages 150 in the cap piece 122 may also be fluidly connected to the apertures 138 and 142 (shown in FIG. 1) along the tip rail 136 via cooling channels. The cooling channels may form a network, as described herein.

The interior region 206 of the body 106 also includes cavities 208. The cavities 208 are elongated and are also referred to herein as tubular cavities without limiting the cross-sectional shape of the cavities 208. For example, the tubular cavities 208 may have a circular cross-sectional shape, a polygonal cross-sectional shape, an elliptical cross-sectional shape, or the like. The depth dimension of the tubular cavities 208 is greater than the diameter or length of the cross-section. A first set 210 of tubular cavities 208 is defined within the base piece 120. The tubular cavities 208 of the first set 210 are open along the mating surface 202 and extend from the mating surface 202 in a direction towards the mounting end 110. A second set 212 of the tubular cavities 208 is defined within the cap piece 122. The tubular cavities 208 of the second set 212 are open along the mating surface 204 and extend from the mating surface 204 in a direction towards the distal end 112. The second set 212 may mirror the first set 210 in the number of tubular cavities 208, the size and shape of the openings to the tubular cavities 208, and/or the positioning of the tubular cavities 208. In the illustrated embodiment, the three tubular cavities 208 of the first set 210 are configured to mirror the three tubular cavities 208 of the second set 212 across the interface 124 when the base and cap pieces 120, 122 are coupled. As a result, each tubular cavity 208 in the first set 210 is configured to align with and fluidly connect to a different corresponding tubular cavity 208 in the second set 212 when the body 106 is formed. For example, each tubular cavity 208 in the first set 210 may be colinear with the corresponding tubular cavity 208 in the second set 212.

The tubular cavities 208 in the body 106 may be formed as a result of using support posts to mechanically support and secure a plurality of thin rods of the core during a metal casting process to form the body 106. For example, the core is the portion of the mold that is interior of the shell. The molten metal is poured into the shell and surrounds the core. The structural components of the core within the shell define voids in the body 106 once the metal material of the body 106 hardens and the core is removed from the body 106 during a post-processing stage of the casting process. For example, the thin rods of the core are configured to define a network of cooling channels within the interior region 206 of the body 106. The core may include support posts that provide structural support and strength to the thin rods to prohibit the rods from breaking, bending, or otherwise not conforming to a designated shape. The support posts may also assist with securing and maintaining the thin rods in designated positions during the casting process, especially while the molten metal is flowed into the shell to surround the thin rods and other components of the core. Therefore, all or some of the tubular cavities 208 in the body 106 may be artifacts of the support posts of the core. After the casting process is complete, the tubular cavities 208 may be utilized for receiving the conductive pins 130. Inserting the conductive pins 130 into the tubular cavities 208 utilizes the tubular cavities 208 for aligning and coupling the two pieces 120, 124 of the body 106 and/or for thermal conduction paths, as described herein. In an alternative embodiment, the core of the casting mold includes posts specifically and exclusively designed to define the tubular cavities 208 in the body 106 for alignment purposes and/or thermal conduction purposes, such that the posts do not provide structural support to any thin rods of the core used to define cooling channels.

The conductive pins 130 are elongated shafts. The pins 130 are cylindrical in the illustrated embodiments. Alternatively, the pins 130 may be other than cylindrical, such that the pins 130 have non-circular cross-sections, including for example, elliptical or polygonal cross-sections. Furthermore, the pins 130 in an alternative embodiment may not be linear or straight, such that the pins 130 have a bend or curve or define an angle. The multiple pins 130 of the airfoil 102 optionally are identical to each other in size, shape, and/or material composition. In an embodiment, the pins 130 are both electrically and thermally conductive. The material composition of the conductive pins 130 includes one or more metals. The metal in the pins may be the same metal that is in the body 106 of the airfoil 102. Alternatively, the metal in the pins 130 may be different from the metal in the body 106. In one or more embodiments, the material composition of the pins 130 is different from the material composition of the body 106. For example, the pins 130 may have greater thermal conductivity (e.g., be more thermally conductive) than the body 106. As a result, the pins 130 may provide thermal conduction paths along the lengths of the pins 130 for transferring heat away from high temperature areas of the airfoil 102. The pins 130 may include a protective coating that surrounds the metal of the pins 130 to prohibit corrosion, oxidation, and/or reacting with the material of the body 106. The protective coating may include aluminum oxide (e.g., alumina), silicon dioxide, an epoxy or resin, or the like.

In a non-limiting example, the conductive pins 130 include one or more refractory metals. For example, the pins 130 may include molybdenum, tungsten, tantalum, niobium, iridium, osmium, rhenium, ruthenium, rhodium, platinum, and/or copper, including alloys of these metals. The refractory metal cores may be covered by oxide coatings to protect the refractory metals from reacting with nickel and/or other metals of the body 106. In a non-limiting example, the pins 130 may include molybdenum surrounded by an alumina (also known as aluminum oxide) coating. In an alternative embodiment, the pins 130 are thermally conductive but electrically non-conductive. For example, the pins 130 may include one or more non-metallic thermally conductive materials without including metals. The non-metallic thermally conductive materials may include, for example, alumina, silicon nitride, or the like.

Figure 3:
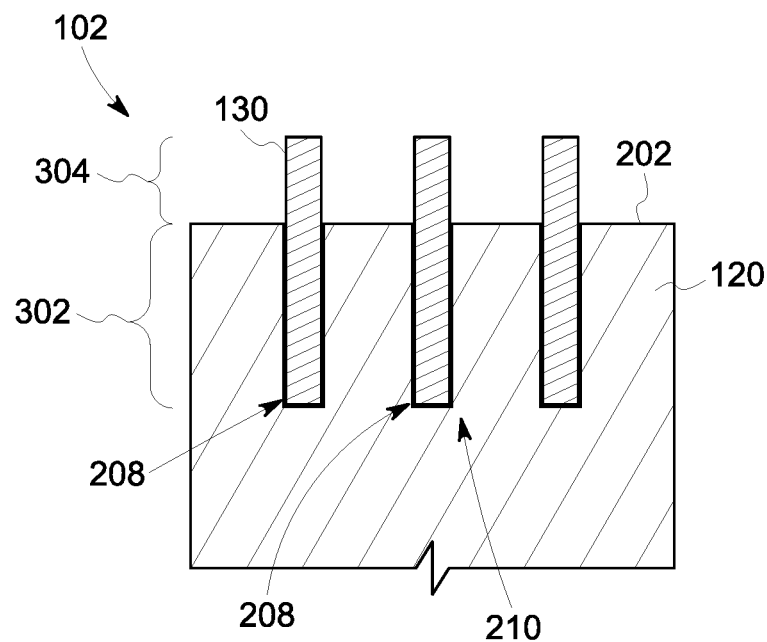
FIG. 3 is a cross-sectional view of a portion of a base piece and thermally conductive pins of the airfoil taken along line 3-3 in FIG. 2.

FIG. 3 is a cross-sectional view of a portion of the base piece 120 and the conductive pins 130 of the airfoil 102 taken along line 3-3 in FIG. 2. FIG. 3 represents an intermediate assembly stage of the airfoil 102 prior to coupling the base piece 120 to the cap piece 122 (shown in FIG. 2) according to an embodiment. The conductive pins 130 are shown loaded into the first set 210 of tubular cavities 208 in the base piece 120. For example, each pin 130 is inserted into a different corresponding tubular cavity 208. The pins 130 are designed to project out of the tubular cavities 208 beyond the mating surface 202. For example, the pins 130 may be longer than the depth of the tubular cavities 208. A first segment 302 of each of the conductive pins 130 is disposed within the corresponding tubular cavity 208, and a second segment 304 of each pin 130 is disposed outside of the tubular cavity 208 and projects beyond the mating surface 202. The conductive pins 130 may be parallel to one another when loaded in the tubular cavities 208. Optionally, the pins 130 at this intermediate stage are retained within the first set 210 of the tubular cavities 208 by gravity and/or friction. Alternatively, the pins 130 may be secured in place within the first set 210 of the tubular cavities 208 by subsequently applying an adhesive, a braze filler material, a mechanical fastener, or the like. In another alternative embodiment, the pins 130 and interior surfaces of the tubular cavities 208 may be threaded or otherwise have complementary structures to enable securing the pins 130 in the cavities 208 without applying additional components or materials.

After the conductive pins 130 are loaded into the tubular cavities 208 of the base piece 120, the cap piece 122 (shown in FIG. 2) can be coupled to the base piece 120 to define the body 106. The cap piece 122 may be moved towards the base piece 120 which is static; the base piece 120 may be moved towards the cap piece 122 which is static; or both pieces 120, 122 may be moved towards each other. The base piece 120 and the cap piece 122 are configured to couple to each other along a mating axis that is parallel to the orientation of the conductive pins 130. The conductive pins 130 function as guide posts to guide the coupling of the two pieces 120, 122. For example, the second segments 304 of the pins 130 are received into the tubular cavities 208 (shown in FIG. 2) of the cap piece 122. The tubular cavities 208 may be sized only slightly larger than the pins 130. As a result, the cap piece 122 and the base piece 124 substantially align with each other to enable the second segments 304 of the pins 130 to be received within the corresponding tubular cavities 208 of the cap piece 122. Once the second segments 304 enter the openings of the corresponding tubular cavities 208 of the cap piece 122, the relatively small clearances between the pins 130 and the interior surfaces of the tubular cavities 208 guide the remaining movement of the two pieces 120, 122 until the two pieces 120, 122 meet at the interface 124 (shown in FIG. 1).

Figure 4:
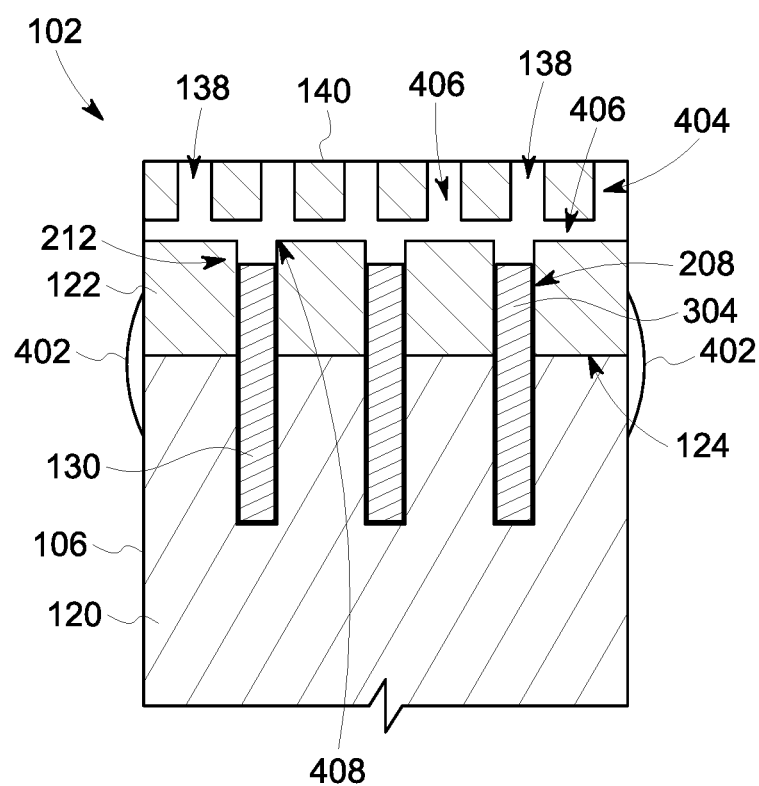
FIG. 4 is a cross-sectional view of a portion of the airfoil taken along line 3-3 in FIG. 2 showing the airfoil fully assembled.

FIG. 4 is a cross-sectional view of a portion of the airfoil 102 taken along line 3-3 in FIG. 2 showing the airfoil 102 fully assembled. FIG. 4 represents a finished stage of the airfoil assembly process. When the cap piece 122 is coupled to the base piece 120, the conductive pins 130 extend across the interface 124, and the second segments 304 of the pins 130 are disposed within the second set 212 of tubular cavities 208. The base piece 120 may be securely affixed to the cap piece 122 to prohibit or prevent future uncoupling of the pieces 120, 122 during operation of the airfoil 102. In the illustrated embodiment, the two pieces 120 may be rigidly affixed via brazing. For example, a braze filler material 402 may be applied on the base piece 120 and the cap piece 122 at and around the interface 124. A heat application causes the two pieces 120, 122 to chemically bond (e.g., weld) at the interface 124, resulting in the formation of a unitary, one-piece or monolithic body 106 that encases the conductive pins 130. Alternatively, a different process may be performed to securely affix the two pieces 120, 122 together at the interface 124, such as welding, soldering, or the like.

In one or more embodiments, at least some of the tubular cavities 208 are fluidly connected to a network 404 of cooling channels 406 within the interior of the body 106. The cooling channels 406 are configured to distribute cooling fluid (e.g., a coolant), such as air, water, or the like, for absorbing and transferring heat. In the illustrated embodiment, some of the cooling channels 406 are fluidly connected to the apertures 138 at the distal edge 140 of the cap piece 122. Other cooling channels 406 in the network 404 may be fluidly connected to the apertures 142 (shown in FIG. 1), the apertures 143 (FIG. 1), the cooling passages 150 (shown in FIG. 2), and/or the like. The cooling fluid may absorb heat from high temperature areas of the body 106, such as along the cap piece 122, and exhaust the increased-temperature cooling fluid from the body 106 through one or more of the apertures 138, 142, 143.

In one or more embodiments, at least some of the cooling channels 406 are fluidly connected to respective interior ends 408 of the tubular cavities 208. The cooling channels 406 may be defined by thin rods of the core during a casting process, and the tubular cavities 208 may be defined by support posts connected to the thin rods during the casting process. As a result of the metal material of the body 106 forming around the thin rods and the support posts connected to the thin rods, the interior ends 408 of the tubular cavities 208 are fluidly connected to the network 404 of cooling channels 406. In one or more embodiments, the conductive pins 130 within the tubular cavities 208 do not obstruct the cooling channels 406 or otherwise interfere with the flow of cooling fluid through the cooling channels 406. For example, the conductive pins 130 may occupy a majority of the volume and/or length of the corresponding tubular cavities 208 without extending beyond the interior ends 408 into the network 404 of cooling channels 406.

Furthermore, because the conductive pins 130 are thermally conductive and are exposed to the cooling channels 406 via the tubular cavities 208, the conductive pins 130 may provide thermal conduction paths to the cooling fluid in the cooling channels 406. For example, the conductive pins 130 may absorb heat from the metal material of the body 106 and may transfer or convey the heat to the cooling fluid in the cooling channels 406 for dissipating heat from high temperature areas of the body 106. As described above, the conductive pins 130 may have a greater thermal conductivity than the metal material of the body 106, so the heat may more readily transfer through the conductive pins 130 than the body 106. The pins 130 also extend across the interface 124, so the heat conducted along the pins 130 may have a lower thermal resistance at the interface 124 than heat conducted across the interface 124 through the material of the body 106.

In the embodiments shown and described herein, the second piece 122 is described as a cap or tip of the airfoil, but in an alternative embodiment, the second piece 122 may be a tail piece along the trailing edge, for example, or another part of the airfoil. Furthermore, although only the cap piece 122 is shown in FIG. 4 as defining cooling channels 406 fluidly connected to the tubular cavities 208, optionally the base piece 120 may also define cooling channels fluidly connected to the tubular cavities 208. Although the embodiment shown in FIGS. 1 through 4 has a two-part body 106 that is cast in two pieces 120, 122 and subsequently joined, the embodiments described herein are not limited to multi-part airfoil bodies 106 and could also be applied with unitary, one-piece airfoil bodies that are fully formed during the casting process.

Figure 5:
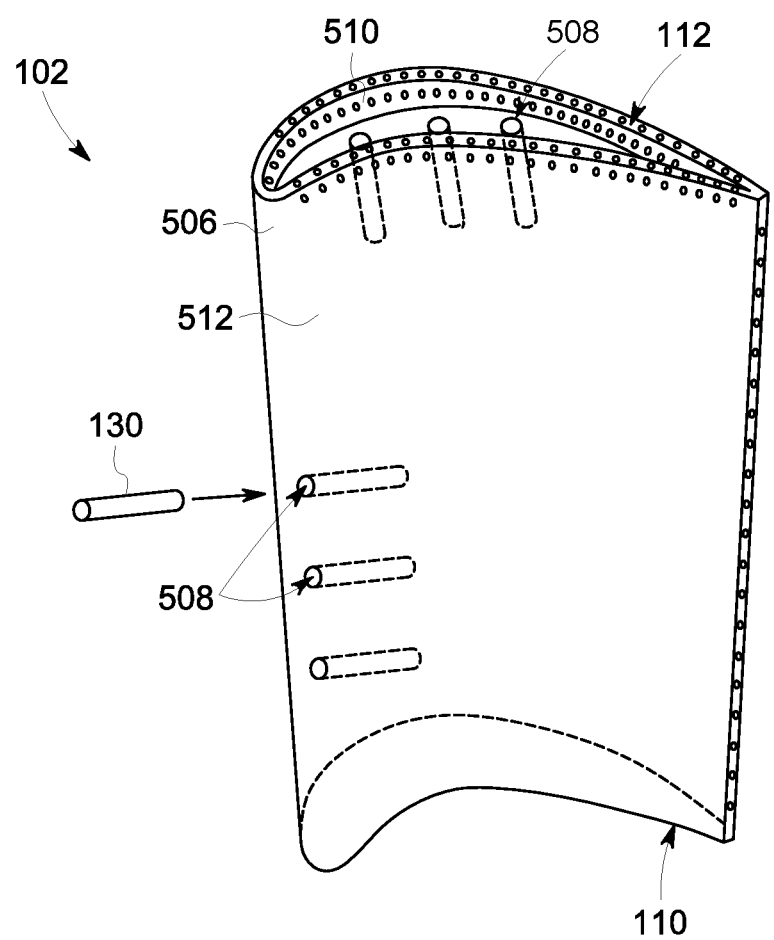
FIG. 5 is a perspective view of the airfoil according to an alternative embodiment.

For example, FIG. 5 is a perspective view of the airfoil 102 according to an alternative embodiment. The airfoil 102 has a unitary, one-piece body 506 that resembles the body 106 shown in FIG. 1 in size and shape. Unlike the body 106, the body 506 is formed in one piece during a casting process in which molten metal is poured into a mold including a shell and a core. A tip rail 510 at the distal end 112 of the airfoil 102 is formed in the same mold at the same time as the mounting end 110. Like the body 106 described above, the body 506 may include a network of cooling channels disposed within an interior region of the body 506, and the network is defined by thin rods of the core that may be supported by support posts during the casting process.

The body 106 defines tubular cavities 508 that extend into the interior region from one or more exterior surfaces. The tubular cavities 508 may be defined by the support posts of the core upon removing the core (e.g., such as through chemical etching or the like). In the illustrated embodiment, three tubular cavities 508 are open along a concave-shaped exterior surface 512 of the body 506, and three additional tubular cavities 508 are open along the distal end 112. As described above, the airfoil 102 includes the conductive pins 130 which are configured to be loaded into the tubular cavities 508 after the core is removed. The pins 130 may be sized and shaped to plug the tubular cavities 508 which reduces or eliminates local hot spots caused by air pockets and may enhance heat transfer. For example, the pins 130 may absorb heat into the ends of the pins 130 and may transfer the heat from the opposite ends of the pins 130 to a cooling fluid within the cooling channels of the body 506. The location and number of tubular cavities 508 may vary based on application-specific considerations, such as the complexity of the core and desired amount of heat transfer. For example, in an alternative embodiment, the tubular cavities 508 may extend into the body 506 from openings at the mounting end 110.

Figure 6:
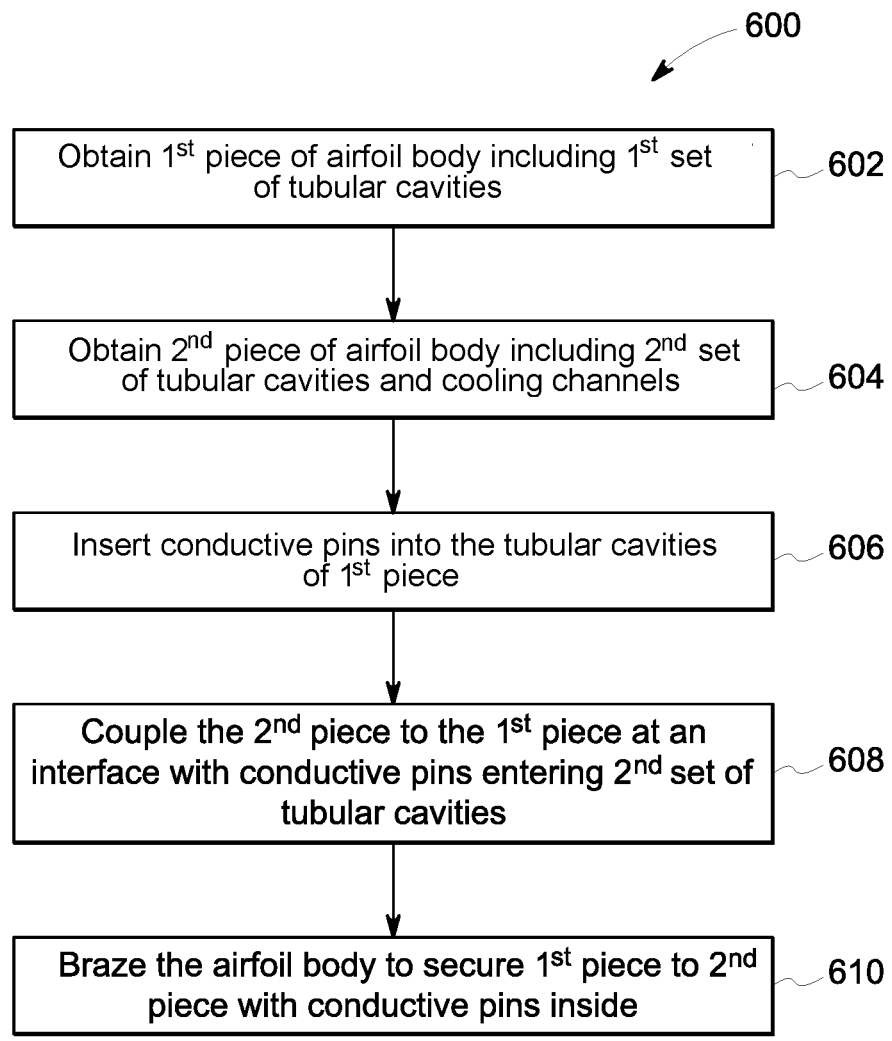
FIG. 6 is a flow chart for a method of producing an airfoil according to an embodiment.

FIG. 6 is a flow chart for a method 600 of producing an airfoil according to an embodiment. The method 600 may be performed to produce the airfoil 102 shown in FIGS. 1 through 4. Optionally, the method 600 may include additional steps not shown in FIG. 6, fewer steps than shown in FIG. 6, different steps than shown in FIG. 6, and/or the steps may be performed in a different order than shown in FIG. 6.

At 602, a first piece 120 of an airfoil body 106 is obtained. The first piece 120 includes a mating surface 202 and defines a first set 210 of multiple tubular cavities 208 that extend parallel to one another and are open at the mating surface 202. The first piece 120 may be obtained by forming the first piece 120 via metal casting or a different type of molding process. At 604, a second piece 122 of the airfoil body 106 is obtained. The second piece 122 includes a second set 212 of tubular cavities 208 and a network 404 of cooling channels 406 within an interior region of the second piece 122. The cooling channels 406 may be fluidly connected to interior ends 408 of the tubular cavities 208 within the second piece 122. The second piece 122 may be obtained by forming the second piece 122, such as via casting.

At 606, plural conductive pins 130 are inserted into the first set 210 of tubular cavities 208 of the first piece 120 such that each pin 130 is received into a different corresponding tubular cavity 208. Each of the conductive pins 130 has a first segment 302 disposed within a corresponding one of the tubular cavities 208 and a second segment 304 that projects beyond the mating surface 202. Optionally, the conductive pins 130 may have a greater thermal conductivity than the material of the first piece 120 of the body 106.

At 608, the second piece 122 is coupled to the first piece 120 by moving one or both of the first piece 120 or the second piece 122 together. The second segments 304 of the conductive pins 130 enter the second set 212 of tubular cavities 208 within the second piece 122 for aligning the second piece 122 to the first piece 120. Optionally, the tubular cavities 208 of the second piece 122 extend parallel to one another and are open at a mating surface 204 of the second piece 122. The mating surface 202 of the first piece 120 and the mating surface 204 of the second piece 122 face each other and define an interface 124 upon coupling the two pieces 120, 122. The conductive pins 130 extend across the interface 124. Upon coupling the second piece 122 to the first piece 120, the second segments 304 of the conductive pins 130 do not extend past the interior ends 408 of the tubular cavities 208 to avoid obstructing the cooling channels 406.

At 610, the method 600 may include brazing the airfoil body 106 after coupling the second piece 122 to the first piece 120 to securely affix the second piece 122 to the first piece 120. The brazing may include applying a braze filler material at the interface. The brazing may also include applying the braze filler material along the mating surfaces 202, 204 and/or along the pins 130 in the tubular cavities 208 to fill air gaps. After brazing, the airfoil 102 has a unitary, one-piece (e.g., monolithic) body 106 without a seam at the interface 124.

At least one technical effect of the embodiments described herein includes more efficient and reliable formation of complex and/or fine cooling passages in the airfoil via the use of the support posts to reduce strain on the thin rods of the core during the molding (e.g., casting) process. The small cooling channels may enable more efficient use of a coolant fluid, such as air, a different gas, or a liquid. Another technical effect is enhanced thermal heat transfer through the interior of the airfoil into the cooling channels attributable to the conductivity of the thermally conductive pins. For example, the pins may provide thermal conductivity paths that efficiently direct heat from outer or exterior walls of the body to the cooling channels. Yet another technical effect of the embodiments described herein includes, for two-part airfoil bodies, more precise and efficient alignment and coupling of the two pieces of the airfoil body via the use of the thermally conductive pins as guide posts.

In at least one embodiment, an airfoil is provided that includes a multi-part body and one or more thermally conductive pins. The multi-part body has an interior region and is formed from multiple pieces joined with each other at an interface. The pieces have multiple cavities and at least one of the pieces defines airfoil cooling channels disposed within the interior region of the body. The one or more thermally conductive pins are within the interior region of the body and extend across the interface. Each of the thermally conductive pins has a first segment disposed within a corresponding cavity of a first piece of the multiple pieces and a second segment disposed within a corresponding cavity of a second piece of the multiple pieces.

Optionally, the first piece is a base piece and the second piece is a cap piece.

Optionally, the cooling channels are fluidly connected to respective interior ends of the cavities of the at least one of the first piece or the second piece defining the cooling channels.

Optionally, the one or more thermally conductive pins within the cavities of the first and second pieces do not extend into the cooling channels.

Optionally, the one or more thermally conductive pins are entirely disposed within the interior region of the body.

Optionally, a braze filler material is disposed on the first piece and the second piece at the interface to securely affix the first piece to the second piece.

Optionally, a material composition of the body is different from a material composition of the one or more thermally conductive pins. Optionally, the material composition of the one or more thermally conductive pins has a greater thermal conductivity than the material composition of the body.

Optionally, the one or more thermally conductive pins include molybdenum, tungsten, tantalum, niobium, iridium, osmium, rhenium, ruthenium, rhodium, platinum, and/or copper.

Optionally, the one or more thermally conductive pins include molybdenum surrounded by an alumina coating.

Optionally, the body extends along a length axis from a mounting end of the body to a distal end of the body opposite the mounting end. Each of the one or more thermally conductive pins is oriented parallel to the length axis of the body.

In one or more embodiments, a method for producing an airfoil is provided that includes obtaining first and second pieces of a multi-part body. Each of the first and second pieces includes a respective mating surface and defines multiple respective cavities that extend parallel to one another and are open at the mating surface. The method includes inserting one or more thermally conductive pins into the cavities of the first piece such that each thermally conductive pin is received into a different corresponding cavity. Each of the one or more thermally conductive pins has a first segment disposed within a corresponding one of the cavities of the first piece and a second segment that projects beyond the mating surface of the first piece. The method also includes coupling the second piece of the multi-part body to the first piece such that the second segment of each thermally conductive pin is received into a corresponding cavity of the second piece for aligning the second piece to the first piece.

Optionally, the mating surface of the first piece and the mating surface of the second piece face each other and define an interface upon coupling the second piece to the first piece. The one or more thermally conductive pins extend across the interface.

Optionally, the method also includes, subsequent to coupling the second piece to the first piece, brazing the airfoil body to securely affix the second piece to the first piece.

Optionally, the second piece of the airfoil body defines the cavities thereof and a network of cooling channels disposed within an interior region of the second piece. The cooling channels are fluidly connected to respective interior ends of the cavities of the second piece. Optionally, upon coupling the second piece to the first piece, the second segments of the one or more thermally conductive pins do not extend past the interior ends of the cavities of the second piece into the cooling channels.

Optionally, the first piece of the airfoil body is obtained by forming the first piece to have a material composition that has a lower thermal conductivity than a material composition of the one or more thermally conductive pins.

In one or more embodiments, an airfoil is provided that includes a body and one or more thermally conductive pins. The body has exterior surfaces and an interior region. The body defines multiple cavities and a network of cooling channels within the interior region. The cavities are parallel to one another. The network of cooling channels is fluidly connected to respective interior ends of the cavities. The one or more thermally conductive pins are disposed within the cavities such that each thermally conductive pin is disposed within a different corresponding cavity. The one or more thermally conductive pins fill at least a majority of the corresponding cavities without extending into the network of cooling channels. A material composition of the one or more thermally conductive pins has a greater thermal conductivity than a material composition of the body.

Optionally, the cavities of the body extend into the interior region from one of the exterior surfaces of the body.

Optionally, the body is a multi-part body defined by a first piece and a second piece that couple to one another at an interface. A first set of the cavities of the body are defined within the first piece and a second set of the cavities are defined within the second piece. The second set mirrors the first set across the interface to enable each of the one or more thermally conductive pins to be disposed within one corresponding cavity of the first set and one corresponding cavity of the second set.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The above description is illustrative and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of ordinary skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil comprising:
a multi-part body having an interior region and formed from multiple pieces joined with each other at an interface, the multiple pieces each having multiple cavities, and at least one of the multiple pieces defining airfoil cooling channels disposed within the interior region of the multi-part body, wherein at least some of the airfoil cooling channels are fluidly connected to respective interior ends of at least some of the multiple cavities; and
one or more thermally conductive pins within the interior region of the multi-part body and extending across the interface, wherein each of the one or more thermally conductive pins has a first segment disposed within a corresponding cavity of a first piece of the multiple pieces and a second segment disposed within a corresponding cavity of a second piece of the multiple pieces.

2. The airfoil of claim 1, wherein the first piece is a base piece and the second piece is a cap piece.

3. The airfoil of claim 1, wherein the one or more thermally conductive pins within the multiple cavities of the first and second pieces do not extend into the airfoil cooling channels.

4. The airfoil of claim 1, wherein the one or more thermally conductive pins are entirely disposed within the interior region of the multi-part body.

5. The airfoil of claim 1, wherein a braze filler material is disposed on the first piece and the second piece at the interface to securely affix the first piece to the second piece.

6. The airfoil of claim 1, wherein a material composition of the multi-part body is different from a material composition of the one or more thermally conductive pins.

7. The airfoil of claim 6, wherein the material composition of the one or more thermally conductive pins has a greater thermal conductivity than the material composition of the multi-part body.

8. The airfoil of claim 1, wherein the one or more thermally conductive pins include one or more of molybdenum, tungsten, tantalum, niobium, iridium, osmium, rhenium, ruthenium, rhodium, platinum, or copper.

9. The airfoil of claim 1, wherein the one or more thermally conductive pins include molybdenum surrounded by an alumina coating.

10. The airfoil of claim 1, wherein the multi-part body extends along a length axis from a mounting end of the multi-part body to a distal end of the multi-part body opposite the mounting end, wherein each of the one or more thermally conductive pins is oriented parallel to the length axis of the multi-part body.

11. A method for producing an airfoil comprising:
obtaining first and second pieces of a multi-part body, each of the first and second pieces including a respective mating surface and defining multiple respective cavities that extend parallel to one another and are open at the respective mating surface, wherein the second piece defines a network of cooling channels within an interior region of the second piece, and the network of cooling channels is fluidly connected to respective interior ends of at least some of the multiple cavities in the second piece;
inserting one or more thermally conductive pins into the multiple cavities of the first piece such that each of the one or more thermally conductive pins is received into a different corresponding cavity, wherein each of the one or more thermally conductive pins has a first segment disposed within a corresponding one of the multiple cavities of the first piece and a second segment that projects beyond the mating surface of the first piece; and
coupling the second piece of the multi-part body to the first piece such that the second segment of each of the one or more thermally conductive pins is received into a corresponding cavity of the second piece for aligning the second piece to the first piece.

12. The method of claim 11, wherein the mating surface of the first piece and the mating surface of the second piece face each other and define an interface upon coupling the second piece to the first piece, the one or more thermally conductive pins extending across the interface.

13. The method of claim 11, further comprising, subsequent to coupling the second piece to the first piece, brazing the multi-part body to securely affix the second piece to the first piece.

14. The method of claim 11, wherein, upon coupling the second piece to the first piece, each of the second segments of the one or more thermally conductive pins do not extend past the interior ends of the multiple cavities of the second piece into the network of cooling channels.

15. The method of claim 11, wherein the first piece of the multi-part body is obtained by forming the first piece to have a material composition that has a lower thermal conductivity than a material composition of the one or more thermally conductive pins.

16. The method of claim 11, wherein the first piece is a base piece and the second piece is a cap piece, and coupling the second piece of the multi-part body to the first piece comprises attaching the cap piece onto a distal end of the base piece that is opposite a mounting end of the base piece, the mounting end configured to be attached to a hub of a rotor assembly.

17. An airfoil comprising:
a body having exterior surfaces and an interior region, the body defining multiple cavities and a network of cooling channels within the interior region, the multiple cavities being parallel to one another, the network of cooling channels fluidly connected to respective interior ends of the multiple cavities; and
one or more thermally conductive pins disposed within the multiple cavities such that each of the one or more thermally conductive pins is disposed within a different corresponding cavity of the multiple cavities, each of the one or more thermally conductive pins filling at least a majority of the corresponding cavity without extending into the network of cooling channels,
wherein a material composition of the one or more thermally conductive pins has a greater thermal conductivity than a material composition of the body.

18. The airfoil of claim 17, wherein the multiple cavities of the body extend into the interior region from one of the exterior surfaces of the body.

19. The airfoil of claim 17, wherein the body is a multi-part body defined by a first piece and a second piece that couple to one another at an interface, wherein a first set of the multiple cavities of the body are defined within the first piece and a second set of the multiple cavities are defined within the second piece, wherein the second set mirrors the first set across the interface to enable each of the one or more thermally conductive pins to be disposed within one corresponding cavity of the first set and one corresponding cavity of the second set.

20. The airfoil of claim 19, wherein the body extends along a length axis from a mounting end of the body to a distal end of the body opposite the mounting end, the mounting end configured to be attached to a hub of a rotor assembly, wherein the first piece is a base piece that defines a first length of the body from the mounting end to the interface, and the second piece is a cap piece that defines a second length of the body from the interface to the distal end.

* * * * *